H. A. SMOCK.
KEROSENE BLOW TORCH.
APPLICATION FILED JAN. 28, 1919.
1,308,452.
Patented July 1, 1919.
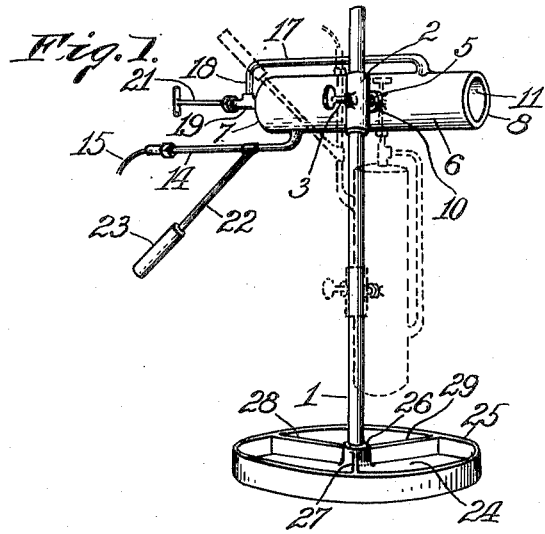
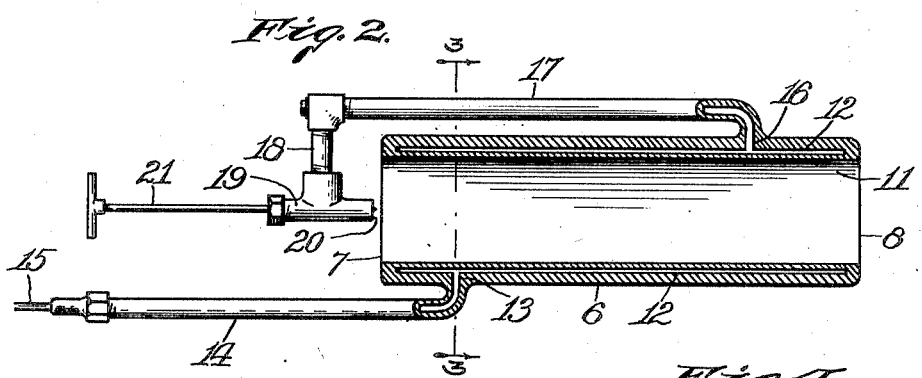
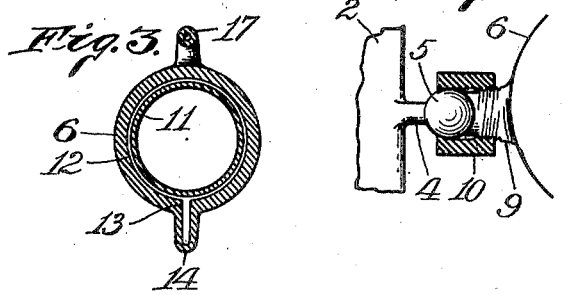
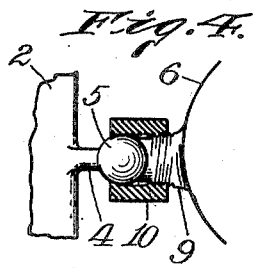
INVENTOR.
Howard A. Smock,
BY Frank W. Hoerner,
ATTORNEY.

UNITED STATES PATENT OFFICE.

HOWARD A. SMOCK, OF INDIANAPOLIS, INDIANA, ASSIGNOR OF ONE-TENTH TO THOMAS COHEN, OF INDIANAPOLIS, INDIANA.

KEROSENE BLOW-TORCH.

1,308,452.  Specification of Letters Patent.  Patented July 1, 1919.

Application filed January 28, 1919. Serial No. 273,639.

*To all whom it may concern:*

Be it known that I, HOWARD A. SMOCK, a citizen of the United States, residing at Indianapolis, in the county of Marion and State of Indiana, have invented certain new and useful Improvements in Kerosene Blow-Torches, of which the following is a specification.

This invention relates to improvements in blow torches whereby kerosene is utilized as a medium for supporting combustion instead of gasolene, as now generally obtains in this class of torches; and one of the objects of the invention is to provide a blow torch of the above character which will readily convert kerosene into gas for supporting the necessary combustion, and whereby a higher degree of heat can be secured and maintained than by the use of gasolene, and thereby rendering the torch particularly valuable as a means for preheating metals, either for the purpose of brazing or preparatory to welding by oxy-acetylene process.

A further object of the invention consists in the provision of a blow torch utilizing kerosene as a medium for supporting combustion whereby, through the reduction in the cost of the combustible medium employed as compared with the use of gasolene a constant saving is not only effected in the operation of the torch, but the constant danger incident with the use and the handling of gasolene is materially reduced.

With the above-mentioned and other objects in view, the invention consists in a blow torch having novel features of construction to permit the torch to convert kerosene into gas or gaseous fluid and to insure combustion of the fluid in the torch; and, the invention consists also further in the parts and combinations and arrangements of parts as hereinafter particularly described and further set forth in the accompanying claims.

Referring to the drawings,—Figure 1 is a perspective view of the apparatus comprised in the invention as preferably constructed; Fig. 2 is a longitudinal sectional view of the principal elements of the improved torch; Fig. 3 is a section on the line 3—3 in Fig. 2; and, Fig. 4 is a fragmentary detail of the apparatus.

Similar reference characters in the different figures of the drawings indicate like parts or features of construction herein referred to in detail.

As preferably constructed the invention comprises a straight standard 1 on which a sleeve 2 is movably arranged, the sleeve being provided with a set-screw 3 whereby the sleeve may be adjustably secured to the standard. The sleeve has a neck projection 4 thereon provided with a spherical or ball-joint member 5 thereon. The improved blow torch comprises more essentially a torch barrel 6 which preferably is cylindrical and has open inlet and outlet ends 7 and 8, respectively, and between which the barrel has an external boss 9 that is suitably seated on the member 5 and is provided with a nut 10 that is secured thereon and engages the member 5, to constitute a collar adapted to secure the member 5 adjustably to the boss 9 to enable the sleeve 2 to support the barrel at various angles. The barrel has a bore or inside wall portion 11 which preferably is uniform in diameter throughout. The wall of the barrel has a generating chamber 12 therein that extends about the bore 11 relatively closer to the bore than to the outer side of the barrel and nearly to the ends of the barrel. In proximity to the inlet end 7 of the barrel the wall thereof has an inlet port 13 that extends to the chamber 12 and has a supply pipe 14 connected therewith, the pipe preferably being rigid on the wall of the barrel and it has an extension 15 which preferably is flexible to extend to any suitable source of supply. In proximity to the opposite or outlet end 8 of the barrel the wall thereof has a port 16 that extends to the chamber 12 and has a conducting pipe 17 connected therewith, the pipe extending rearward beyond the inlet end of the barrel and having a lateral branch 18 to which a valve 19 is connected so as to be arranged adjacent to the inlet end 7 and adapted to constitute a jet-nozzle having an orifice end 20 arranged to deliver gas into the bore 11. The valve has an operating stem 21 which preferably is of considerable length.

In order to enable the operator to handle the torch barrel safely a suitable handle arm 22 is provided which preferably is connected to the supply pipe 14 and has a handle grip 23 thereon of such material as to not become excessively heated.

The standard 1 is preferably provided with a base comprising a bottom plate 24 having a wall 25 on its edge portion and a boss 26 on its middle portion, the boss being secured to the standard to vertically support it; and in order to provide a small basin or a number of them if desired the bottom plate has a number of partitional walls 27, 28 and 29 thereon extending from the boss to the outer wall 25.

In practical use it may in some cases be an advantage to place a little gasolene in one of the basins in the top of the supporting base and turn the barrel 6 with its outlet end downward, lowering the sleeve 2 as may be desired, as indicated by broken lines in Fig. 1, and igniting the kerosene, the resulting flame causing the outlet portion of the barrel to become heated. The kerosene or other volatile liquid fuel is admitted through the port 14 to the chamber 12; the heated inner wall of the chamber imparting its heat to the liquid and converting it into a gaseous fluid which escapes through the port 16 and is conducted to the jet-nozzle 20, escaping forcibly into the barrel 11 in which the gas is ignited with a result that a flame is forcibly projected from the outlet end 8 of the barrel and utilized as may be desired, the valve 19 being adjusted to supply the gaseous fluid according to requirements.

Having thus described the invention, what is claimed as new is—

1. A kerosene blow-torch comprising a base having a basin, a standard secured to the base, a sleeve adjustably secured to the standard, a barrel adjustably connected to the sleeve and having a generating chamber extending about the bore of the barrel, an inlet pipe and an outlet pipe connected with the chamber, and a jet-nozzle arranged at one end of the barrel and connected with the outlet pipe.

2. A kerosene blow-torch comprising a base having a basin, a standard secured to the base, a sleeve adjustably secured to the standard, a barrel adjustably connected to the sleeve and having a generating chamber extending about the bore of the barrel, an inlet pipe and an outlet pipe connected with the chamber, a jet-nozzle arranged at one end of the barrel and connected with the outlet pipe, and a handle arm connected to the inlet pipe.

3. In a kerosene blow-torch, the combination of a base having a basin in its top, a standard secured to the base, a sleeve adjustably connected to the standard and having a ball-joint member thereon, a blow-torch barrel having a boss thereon and arranged in connection with the ball-joint member, a collar engaging the ball-joint member and adjustably connected to said boss, and a handle arm having connection with the blow-torch barrel.

4. In a kerosene blow-torch, a base comprising a bottom plate, a boss on the middle of the plate, an outer wall on the edge portion of the plate, and a plurality of partitional walls on the plate extending from the boss to the outer wall, in combination with a standard vertically supported by said boss, a sleeve adjustably secured to the standard, and a blow-torch barrel adjustably connected to the sleeve to be temporarily supported with its discharge end above said base.

In witness whereof, I have hereunto set my hand and seal at Indianapolis, Indiana, this 22nd day of January, A. D. one thousand nine hundred and nineteen.

HOWARD A. SMOCK. [L. S.]